US009611812B2

(12) United States Patent
Ueno et al.

(10) Patent No.: US 9,611,812 B2
(45) Date of Patent: Apr. 4, 2017

(54) VALVE REFERENCE POSITION-LEARNING DEVICE FOR INTERNAL COMBUSTION ENGINE

(71) Applicant: HONDA MOTOR CO., LTD., Tokyo (JP)

(72) Inventors: Masaki Ueno, Wako (JP); Tsukasa Itou, Wako (JP); Kensuke Yamamoto, Wako (JP); Nobuyuki Oda, Wako (JP); Jun Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/594,453

(22) Filed: Jan. 12, 2015

(65) Prior Publication Data

US 2015/0198120 A1 Jul. 16, 2015

(30) Foreign Application Priority Data

Jan. 14, 2014 (JP) .................................. 2014-003898

(51) Int. Cl.
*F02B 37/18* (2006.01)
*F02M 25/07* (2006.01)
(Continued)

(52) U.S. Cl.
CPC ......... *F02M 25/0771* (2013.01); *F02B 37/18* (2013.01); *F02B 37/186* (2013.01);
(Continued)

(58) Field of Classification Search
CPC ............ F02M 25/0771; F02M 25/0705; F02D 41/007; F02D 41/248; F02D 41/2464;
(Continued)

(56) References Cited

U.S. PATENT DOCUMENTS

2014/0301831 A1* 10/2014 Koike .................. F02B 37/183
415/148
2014/0360178 A1* 12/2014 Wang .................... F02B 37/183
60/602
(Continued)

FOREIGN PATENT DOCUMENTS

DE  102008051817 A1 * 4/2010 .............. F02B 37/18
EP  2 803 837 A1 11/2014
(Continued)

OTHER PUBLICATIONS

German Office Action application No. 10 2015 200 253.5 issued Jun. 17, 2015.
(Continued)

*Primary Examiner* — Nicholas J Weiss
*Assistant Examiner* — Jason T Newton
(74) *Attorney, Agent, or Firm* — Squire Patton Boggs (US) LLP

(57) ABSTRACT

A valve reference position-learning device for an internal combustion engine, which is capable of accurately learning the reference position of a valve both before and after the warm-up of the engine, while properly reflecting thereon a deviation of the reference position caused by the thermal elongation of the valve and drive system after the warm-up of the engine. The valve reference position-learning device calculates and updates a learned value of the reference position of the wastegate valve both at and after the start of the engine, by first and second learnings, respectively. The learned value calculated by the first learning is stored as an existing learned value. Further, at the start of the engine, if the calculation of the learned value is not completed, the learned value is set to the existing stored learned value.

2 Claims, 4 Drawing Sheets

(51) Int. Cl.
*F02D 21/08* (2006.01)
*F02D 23/00* (2006.01)
*F02D 41/24* (2006.01)
*F02D 41/00* (2006.01)
*F02M 26/03* (2016.01)

(52) U.S. Cl.
CPC ............. *F02D 21/08* (2013.01); *F02D 23/00* (2013.01); *F02D 41/0007* (2013.01); *F02D 41/248* (2013.01); *F02D 41/2464* (2013.01); *F02D 41/0077* (2013.01); *F02D 2250/16* (2013.01); *F02M 26/03* (2016.02); *Y02T 10/144* (2013.01)

(58) Field of Classification Search
CPC .......... F02D 21/08; F02D 23/00; F02B 37/18; F02B 37/183; F02B 37/186
USPC .......................................................... 60/602
See application file for complete search history.

(56) References Cited

U.S. PATENT DOCUMENTS

| | | | | |
|---|---|---|---|---|
| 2015/0059337 A1* | 3/2015 | Wang | ................. | F02D 41/1401 60/602 |
| 2015/0059338 A1* | 3/2015 | Wang | ................... | F02B 37/186 60/602 |
| 2015/0082788 A1* | 3/2015 | Wang | ................... | F02B 37/186 60/602 |
| 2015/0094939 A1* | 4/2015 | D'Amato | ................ | F02D 28/00 701/115 |
| 2015/0240707 A1* | 8/2015 | Wang | ..................... | F02B 37/16 60/602 |
| 2015/0292420 A1* | 10/2015 | Wang | .................. | F02D 35/0007 60/602 |
| 2015/0300276 A1* | 10/2015 | Wang | ..................... | F02B 37/16 60/603 |
| 2015/0354441 A1* | 12/2015 | Luehrsen | ............. | F02B 37/186 415/1 |

FOREIGN PATENT DOCUMENTS

| | | | |
|---|---|---|---|
| JP | 4434057 B2 | 3/2010 | |
| JP | 2013-142379 A | 7/2013 | |
| JP | WO 2013105592 A1 * | 7/2013 | ............ F02B 37/183 |

OTHER PUBLICATIONS

German Search Report application No. 10 2015 200 253.5 issued Jun. 17, 2015.

* cited by examiner

VALVE REFERENCE POSITION-LEARNING DEVICE FOR INTERNAL COMBUSTION ENGINE

BACKGROUND OF THE INVENTION

Field of the Invention

The present invention relates to a valve reference position-learning device for an internal combustion engine, for learning a reference position of a valve which regulates flow of exhaust gases or intake air of the engine.

Description of the Related Art

Conventionally, as the learning device of this kind, one disclosed in the Publication of Japanese Patent No. 4434057 is known. This learning device learns a reference position of a wastegate valve that diverts exhaust gases from a turbine of a supercharger of an internal combustion engine. In this learning device, the learning of the reference position is performed after the warm-up of the engine. This takes into consideration that after the warm-up of the engine, when compared with before the warm-up, the temperature of the wastegate valve and a drive system therefor becomes higher and the reference position of the wastegate valve is displaced due to expansion (thermal elongation) of the drive system and the like caused by this temperature rise. Therefore, the learning of the reference position is performed only after the warm-up of the engine to avoid erroneous learning of the reference position.

In the conventional learning device, however, the learning of the reference position of the wastegate valve is performed on condition that the warm-up of the engine is completed, so that in a case where the engine is started in a cold state, it is impossible to learn the reference position until predetermined conditions are satisfied after completion of the warm-up. Therefore, before the reference position can be learned, if the reference position learned after the immediately preceding warm-up of the engine is used for control of supercharging pressure or the like, the reference position deviates from the position in the cold state in which there is no thermal elongation, which can degrade the control accuracy.

Further, it is also known that the reference position of the valve is learned at the time of start of the engine, e.g. by using a time period from the turn-on of an ignition switch to completion of the start (cranking) of the engine. In this case, however, when the turn-on operation of the ignition switch is immediately followed by a starting operation (quick start of the engine is performed), it is impossible to secure time required for learning, so that it is impossible to learn the reference position consistent with the cold state, which can cause the same problem as mentioned above.

SUMMARY OF THE INVENTION

It is an object of the present invention to provide a valve reference position-learning device for an internal combustion engine, which is capable of accurately learning the reference position of a valve both before and after the warm-up of the engine, while properly reflecting thereon a deviation of the reference position caused by the thermal elongation of the valve and a drive system therefor after the warm-up of the engine.

To attain the above object, the present invention provides a valve reference position-learning device for an internal combustion engine, comprising a valve for regulating flow of exhaust gases or intake air of the engine, first reference position-learning means for learning a reference position of the valve at a start of the engine, second reference position-learning means for learning a reference position of the valve when predetermined learning conditions are satisfied after the start of the engine, reference position update means for updating the reference position based on the reference position learned by the first and second reference position-learning means, control means for controlling the valve using the updated reference position, and storage means for storing the reference position learned by the first reference position-learning means, wherein the reference position update means updates, when the reference position is learned by the first or second reference position-learning means, the reference position to the learned reference position, and updates, when learning of the reference position by the first reference position-learning means is not completed at the start of the engine, the reference position to the reference position stored in the storage means.

In this reference position-learning device, the reference position of the valve for regulating flow of exhaust gases or intake air of the engine is learned, at the start of the engine, by the first reference position-learning means, and after the start of the engine, by the second reference position-learning means, when there are satisfied predetermined learning conditions. Further, the reference position is updated based on the reference position thus learned, and the valve is controlled using the updated reference position.

As described above, the learning of the reference position of the valve is performed at the start of the engine and after the start of the engine, and the reference position is updated based on the learned reference position. Therefore, differently from the conventional device in which the learning is performed only after the warm-up of the engine, it is possible to accurately learn the reference position of the valve both before and after the warm-up of the engine, while properly reflecting thereon a deviation of the reference position caused by the thermal elongation of the valve and a drive system therefor after the warm-up of the engine. As a result, it is possible to perform the control of the valve using the learned reference position with high accuracy.

Further, according to this reference position-learning device, at the start of the engine, the reference position learned by the first reference position-learning means is stored in the storage means. Then, the reference position is updated to the learned reference position when the reference position is learned by the first or second reference position-learning means. On the other hand, the reference position is updated to the reference position stored in the storage means when the learning of the reference position by the first reference position-learning means is not completed at the start of the engine e.g. due to the quick start of the engine.

As described above, at the start of the engine, if the learning of the reference position is not completed, the reference position is updated not to the reference position affected by the thermal elongation after the start of the engine but to the reference position learned up to the immediately preceding start of the engine in a state where the reference position is little affected by the thermal elongation. Therefore, in such a case where the engine is started in a cold state, it is possible to properly set the reference position of the valve while eliminating the influence of the thermal elongation, and further improve the learning accuracy.

Preferably, the engine includes a supercharger including a turbine driven by exhaust gases and a compressor driven by the turbine for supercharging intake air, the valve being a wastegate valve provided in a bypass passage bypassing the turbine, for regulating an amount of exhaust gases flowing through the bypass passage, and the wastegate valve is driven by an actuator linked thereto via a linking member, the actuator being mounted on a housing that houses the compressor.

According to the construction of this preferred embodiment, the valve is a wastegate valve for regulating the amount of exhaust gases flowing through a bypass passage bypassing the turbine of the supercharger, and the reference position of the wastegate valve is learned. Further, while the wastegate valve is provided on the side of the turbine, the actuator for driving the wastegate valve is mounted on the housing that houses the compressor of the supercharger and is linked to the wastegate valve via a linking member. Due to this positional relationship, the amount of the thermal elongation of the linking member is liable to increase, so that a deviation of the reference position of the wastegate valve also increases accordingly. Therefore, according to the construction, the advantageous effects described above can be more effectively obtained, and the control of the wastegate valve can be more accurately performed using the learned reference position.

The above and other objects, features, and advantages of the present invention will become more apparent from the following detailed description taken in conjunction with the accompanying drawings.

DETAILED DESCRIPTION OF PREFERRED EMBODIMENTS

Figure 1:
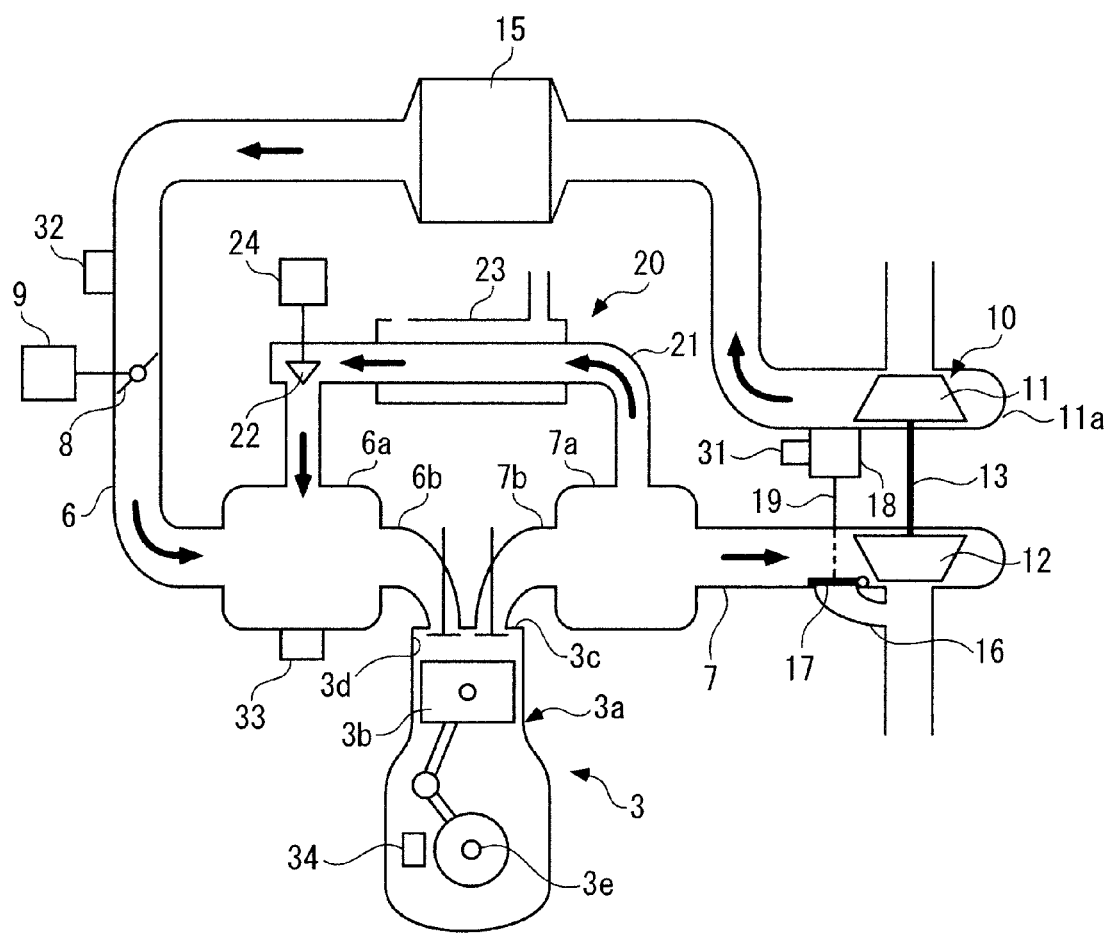
FIG. 1 is a schematic diagram of an internal combustion engine to which is applied the present invention.
Figure 2:
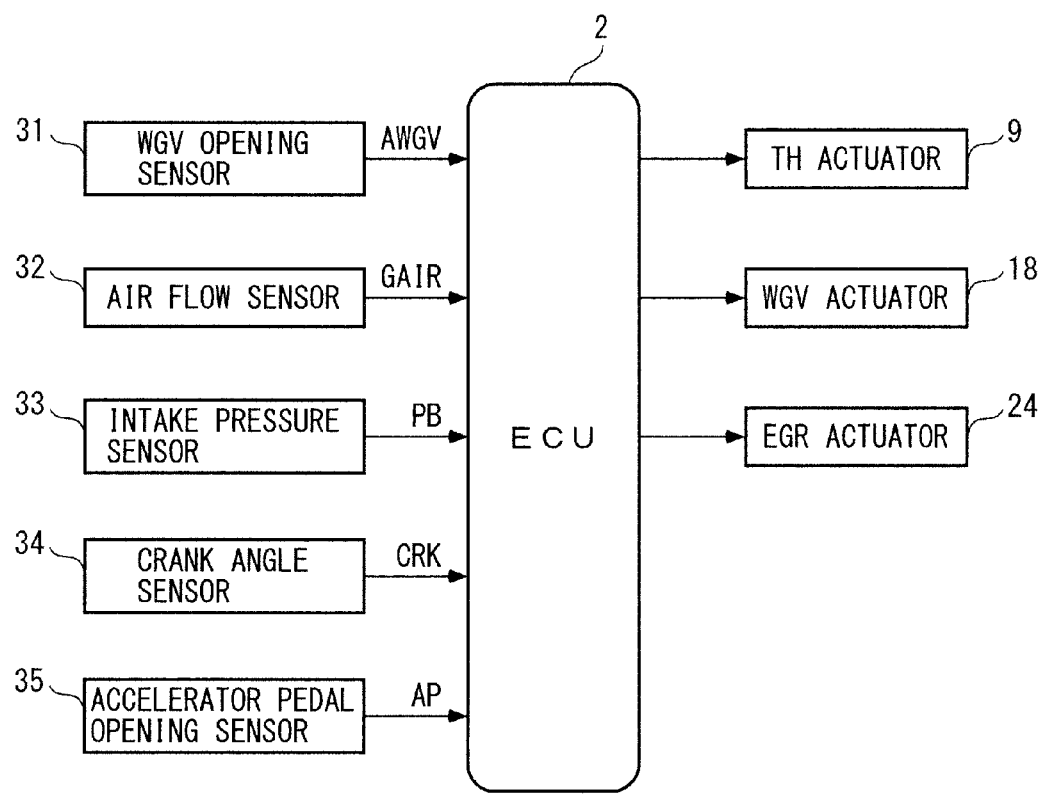
FIG. 2 is a block diagram showing a reference position-learning device for learning a reference position of a wastegate valve.

The invention will now be described in detail with reference to drawings showing a preferred embodiment thereof. FIG. 1 shows an internal combustion engine (hereinafter referred to as "the engine") 3 to which the present invention is applied. The engine 3 is a gasoline engine installed on a vehicle, not shown, and includes e.g. four cylinders 3a (only one of which is shown). A combustion chamber 3d is defined between a piston 3b and a cylinder head 3c of each of the cylinders 3a of the engine 3.

Each cylinder 3a has an intake passage 6 connected thereto via an intake manifold 6b having an intake collector 6a, and has an exhaust passage 7 connected thereto via an exhaust manifold 7b having an exhaust collector 7a. The intake manifold 6b is provided with fuel injection valves (not shown) on a cylinder-by-cylinder basis, and the cylinder head 3c is provided with spark plugs (not shown) on a cylinder-by-cylinder basis.

A throttle valve 8 is disposed in the intake passage 6 at a location upstream of the intake collector 6a. The throttle valve 8 is linked to a TH actuator 9 comprised of a DC motor. An opening degree of the throttle valve 8 is controlled by controlling electric current supplied to the TH actuator 9 by an ECU 2, whereby the amount of intake air drawn into the combustion chamber 3d is regulated.

Further, the engine 3 is provided with a supercharger 10 of a turbocharger type. The supercharger 10 is comprised of a compressor 11 disposed in the intake passage 6 at a location upstream of the throttle valve 8, a turbine 12 disposed in the exhaust passage 7, and a shaft 13 integrally linking the compressor 11 and the turbine 12 to each other. In the supercharger 10, as the turbine 12 is driven for rotation by exhaust gases, the compressor 11 integrally linked thereto is rotated, whereby a supercharging operation for pressurizing intake air in the intake passage 6 is performed.

An intercooler 15 is disposed in the intake passage 6 at a location downstream of the compressor 11, for cooling the pressurized intake air.

The exhaust passage 7 is provided with a bypass passage 16 bypassing the turbine 12, and the bypass passage 16 is provided with a wastegate valve 17 (hereinafter referred to as "the WGV 17"). Further, a housing 11a that houses the compressor 11 is provided with a WGV actuator 18. The WGV actuator 18 is comprised of a DC motor, and is linked to the WGV 17 via a linking member 19 comprised of screws and a link (none of which are specifically shown), whereby the rotation of the WGV actuator 18 is converted to a linear motion of the link to drive the WGV 17.

An opening degree AWGV of the WGV 17 (hereinafter referred to as "the WGV opening degree AWGV") is controlled between a fully-closed position indicated by a solid line in FIG. 1 and a fully-open position (not shown) by controlling electric current supplied to the WGV actuator 18 by the ECU 2. This regulates the amount of exhaust gases flowing through the bypass passage 16 to regulate a driving force of the turbine 12, whereby the supercharging pressure of the supercharger 10 is controlled.

Further, the WGV actuator 18 is provided with a WGV opening sensor 31. The WGV opening sensor 31 detects the WGV opening degree AWGV using the fully-closed position of the WGV 17 as a reference position (zero point position), and delivers a signal indicative of the detected WGV opening degree AWGV to the ECU 2.

Further, the engine 3 is provided with an EGR device 20 for recirculating part of exhaust gases discharged into the exhaust passage 7 to the intake passage 6. The EGR device 20 is comprised of an EGR passage 21, an EGR control valve 22 disposed in the EGR passage 21, and an EGR cooler 23. The EGR passage 21 is connected to the exhaust collector 7a of the exhaust passage 7 and the intake collector 6a of the intake passage 6, thereby communicating between the passages 6 and 7.

The EGR control valve 22 is linked to an EGR actuator 24 comprised of a DC motor. An opening degree LEGR of the EGR control valve 22 is controlled by controlling electric current supplied to the EGR actuator 24 by the ECU 2, whereby the amount of exhaust gases recirculated from the exhaust passage 7 to the intake passage 6 (hereinafter referred to as "the EGR amount") is controlled. The EGR cooler 23 cools high-temperature exhaust gases flowing through the EGR passage 21 using coolant of the engine 3.

Further, the intake passage 6 is provided with an air flow sensor 32 at a location upstream of the throttle valve 8. Further, the intake collector 6a is provided with an intake pressure sensor 33. The air flow sensor 32 detects an intake air amount GAIR, and the intake pressure sensor 33 detects an intake pressure PB at a location downstream of the throttle valve 8, to deliver respective signals indicative of the detected intake air amount GAIR and intake pressure PB to the ECU 2.

Further, a crankshaft 3e of the engine 3 is provided with a crank angle sensor 34. The crank angle sensor 34 delivers a CRK signal, which is a pulse signal, to the ECU 2 along with rotation of the crankshaft 3e, whenever the crankshaft rotates through a predetermined crank angle (e.g. 30°). The ECU 2 calculates a rotational speed NE of the engine 3 (hereafter referred to as the "engine speed NE") based on the CRK signal. Also input to the ECU 2 is a detection signal from an accelerator pedal opening sensor 35, which is indicative of an operation amount AP of an accelerator pedal (not shown) of the vehicle (hereinafter referred to as "the accelerator pedal opening AP").

The ECU 2 is implemented by a microcomputer comprised of a CPU, a RAM, a ROM, an EEPROM, and an I/O interface (none of which are specifically shown). The ECU 2 determines operating conditions of the engine 3 based on the detection signals from the above-described sensors 31 to 35, and performs various control processes for controlling the intake air amount, the supercharging pressure, and the EGR amount, by delivering drive signals based on the determined operating conditions of the engine 3, to the TH actuator 9, the WGV actuator 18, and the EGR actuator 24. In the present embodiment, the ECU 2 corresponds to first reference position-learning means, second reference position-learning means, reference position update means, control means, and storage means.

Figure 3:
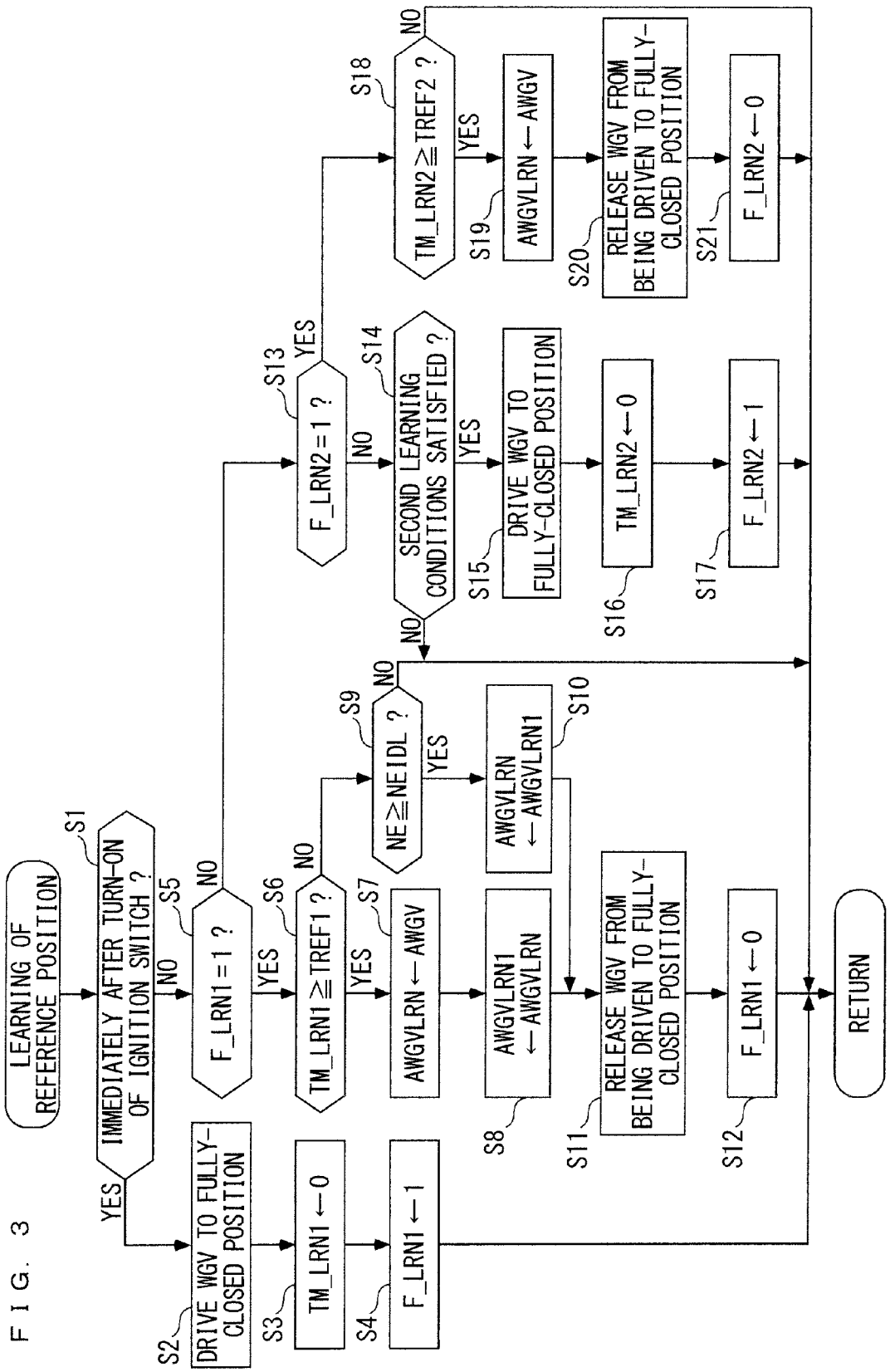
FIG. 3 is a flowchart of a process for learning the reference position of the wastegate valve.

FIG. 3 shows a learning process performed by the ECU 2, for learning the reference position of the WGV 17. The present process learns a detection value of the WGV opening sensor 31 when the WGV 17 is in the fully-closed position, as the reference position (zero point position) of the WGV 17, and is repeatedly carried out at predetermined time intervals.

In the present process, first, in a step 1 (shown as S1 in abbreviated form; the following steps are also shown in abbreviated form), it is determined whether or not the current processing cycle corresponds to a processing cycle immediately after the turn-on of an ignition switch (IG·SW). If the answer to this question is affirmative (YES), in order to perform a first learning (learning at the start of the engine 3) of the reference position, the WGV 17 is driven to the fully-closed position by the WGV actuator 18 (step 2).

Further, a value TM_LRN1 of a first learning timer of an up-count type is reset to 0 (step 3), and to indicate that it is during the first learning, a first learning flag F_LRN1 is set to 1 (step 4), followed by terminating the present process.

If the answer to the question of the step 1 is negative (NO), i.e. if it is not immediately after the ignition switch is turned on, it is determined whether or not the first learning flag F_LRN1 is equal to 1 (step 5). If the answer to the question thereof is affirmative (YES), i.e. if it is during the first learning, it is determined whether or not the first learning timer value TM_LRN1 is not smaller than a predetermined time period TREF1 (step 6).

If the answer to the question of the step 6 is affirmative (YES), i.e. if the predetermined time period TREF1 has elapsed after the start of driving the WGV 17 in the step 2, it is judged that the driven WGV 17 has been driven to the fully-closed position, and the detection value AWGV of the WGV opening sensor 31 at the time is calculated as a learned value AWGVLRN of the reference position (step 7). Further, the calculated learned value AWGVLRN is stored in the EEPROM of the ECU 2 as an existing learned value AWGVLRN1 acquired by the first learning (step 8).

If the answer to the question of the step 6 is negative (NO), it is determined whether or not the engine speed NE is not smaller than a predetermined speed NEIDL corresponding to a start-up engine speed (step 9), and if the answer to the question is negative (NO), the present process is immediately terminated.

On the other hand, if the answer to the question of the step 9 is affirmative (YES), i.e. if due to the turn-on operation of a starter switch, not shown, immediately after the turn-on of the ignition switch (i.e. quick start of the engine), the engine speed NE has reached the predetermined engine speed NEIDL, which means that the start of the engine 3 is completed, before the predetermined time period TREF1 elapses after the start of driving the WGV 17 in the step 2, the first learning is stopped so as to return the WGV 17 from the fully-closed position. In this case, the reference position learned value AWGVLRN is updated to the existing learned value AWGVLRN1 which has been calculated by the first learning performed up to the immediately preceding start of the engine 3 and stored in the EEPROM of the ECU 2 (step 10).

In a step 11 following the above-described step 8 or 10, the WGV 17 is released from being driven to the fully-closed position, and in the following step 12, the first learning flag F_LRN1 is reset to 0, followed by terminating the present process.

After the step 12 is performed as described above, the answer to the question of the step 5 becomes negative (NO), and in this case, in a step 13, it is determined whether or not a second learning flag F_LRN2, referred to hereinafter, is equal to 1. If the answer to this question is negative (NO), it is determined whether or not predetermined conditions for performing the second learning of the reference position (learning after the start of the engine 3) are satisfied (step 14).

The conditions for performing the second learning include a condition that the engine 3 is in a predetermined operating state, such as an idling operating state, or a fuel-cut operating state in which supply of fuel is interrupted. This is because even if the WGV 17 is forcibly driven to the fully-closed position for the second learning, in the idling operating state, an amount of change in supercharging pressure is small, and in the fuel-cut operating state, even if the amount of change in supercharging pressure is large, influence thereof on the operation of the engine 3 is small.

If the answer to the question of the step 14 is negative (NO), i.e. if the conditions for performing the second learning are not satisfied, the present process is immediately terminated. On the other hand, if the answer to the question of the step 14 is affirmative (YES), similarly to the step 2, to perform the second learning, the WGV 17 is driven to the fully-closed position by the WGV actuator 18 (step 15). Further, a value TM_LRN2 of a second learning timer of an up-count type is reset to 0 (step 16), and to indicate that it is during the second learning, the second learning flag F_LRN2 is set to 1 (step 17), followed by terminating the present process.

After the step 17 is thus performed, the answer to the question of the step 13 becomes affirmative (YES), and in this case, it is determined whether or not the second learning timer value TM_LRN2 is not smaller than a predetermined time period TREF2 (step 18). If the answer to this question is negative (NO), the present process is immediately terminated.

On the other hand, if the answer to the question of the step 18 is affirmative (YES), i.e. if the predetermined time period TREF2 has elapsed after the start of driving the WGV 17, it is judged that the WGV 17 has been driven to the fully-closed position, and hence the detection value AWGV of the WGV opening sensor 31 at the time is calculated as the reference position learned value AWGVLRN (step 19). Next, the WGV 17 is released from being driven to the fully-closed position (step 20), and the second learning flag F_LRN2 is reset to 0 (step 21), followed by terminating the present process.

Figure 4:
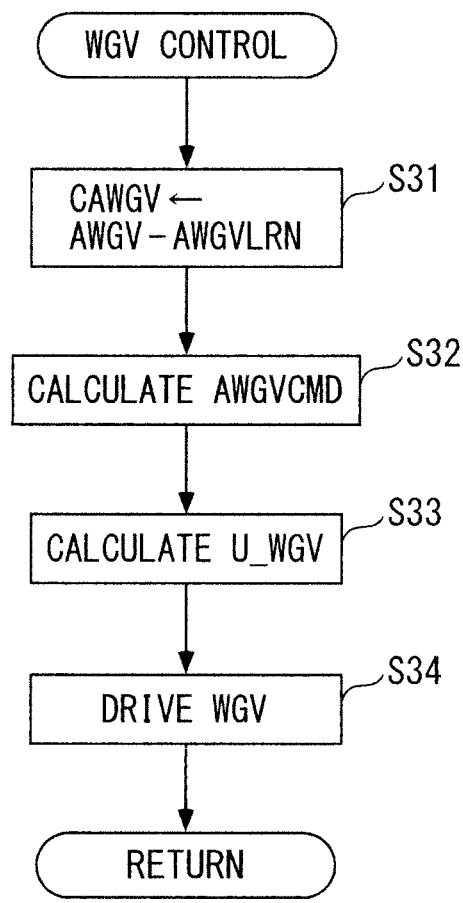
FIG. 4 is a flowchart of a process for controlling the wastegate valve using a learned reference position.

FIG. 4 shows a control process performed, using the reference position learned value AWGVLRN calculated as described above, for controlling the WGV 17. The present process is also repeatedly carried out at predetermined time intervals. In the present process, first, in a step 31, a corrected WGV opening degree CAWGV is calculated by subtracting the learned value AWGVLRN calculated in the process in FIG. 3 from the WGV opening degree AWGV detected by the WGV opening sensor 31. As described hereinabove, since the WGV opening sensor 31 detects the WGV opening degree AWGV using the fully-closed position of the WGV 17 as the reference position (zero point position), the corrected WGV opening degree CAWGV calculated using the learned value AWGVLRN as described above represents a net opening degree of the WGV 17.

Next, a target opening degree AWGVCMD of the WGV 17 is calculated (step 32). The calculation of the target opening degree AWGVCMD is performed e.g. based on parameters, such as a target intake air amount and a target supercharging pressure, which are calculated according to the engine speed NE and a demanded torque PMCMD. Note that the demanded torque PMCMD is calculated based on the engine speed NE and the accelerator pedal opening AP.

Next, a control input U_WGV of the WGV actuator 18 is calculated (step 33). The calculation of the control input U_WGV is performed e.g. based on a relationship between the corrected WGV opening degree CAWGV and the target opening degree AWGVCMD, such that the former becomes equal to the latter. Then, the WGV actuator 18 is driven by delivering a control signal based on the calculated control input U_WGV thereto (step 34), followed by terminating the present process.

As described above, according to the present embodiment, the learned value AWGVLRN of the reference position of the WGV 17 is calculated at and after the start of the engine 3 (steps 7 and 19 in FIG. 3). Therefore, differently from the conventional device where the learning is performed only after the warm-up of the engine, it is possible to accurately learn the reference position of the WGV 17 both before and after the warm-up of the engine, while properly reflecting thereon a deviation of the reference position caused by the thermal elongation of the linking member 19 and the like after the warm-up of the engine. As a consequence, it is possible to accurately control the WGV 17 shown in FIG. 4 using the learned value AWGVLRN.

Further, at the start of the engine 3, e.g. due to the quick start of the same, if the calculation of the learned value AWGVLRN based on the detected WGV opening degree AWGV is not completed, the learned value AWGVLRN is updated to the existing learned value AWGVLRN1 which has been learned and stored by the first learning performed up to the immediately preceding start of the engine 3 (step 10 in FIG. 3). Therefore, in such a case where the engine 3 is started in the cold state, the learned value AWGVLRN1 learned in a state where the influence of the thermal elongation is small is positively used, whereby it is possible to properly set the reference position of the WGV 17 while eliminating the influence of the thermal elongation, and further improve the learning accuracy thereof.

Further, particularly in the present embodiment, since the linking member 19 extends between the WGV 17 on the side of the turbine 12 and the WGV actuator 18 on the side of the compressor 11, the amount of thermal elongation of the linking member 19 tends to be large and the deviation of the reference position of the WGV 17 is liable to increase, and therefore, it is possible to effectively obtain the above-described advantageous effects and accurately control the WGV 17 using the learned value AWGVLRN.

Note that the present invention is by no means limited to the above-described embodiment, but it can be practiced in various forms. For example, although in the above-described embodiment, as conditions for performing the second learning of the reference position of the WGV 17, there are mentioned, by way of example, the condition that the engine 3 is in the idling operating state and the condition that the engine 3 is in the fuel-cut operating state, this is not limitative, but the second learning may be performed in any other suitable operating state, e.g. in a full-load operating state where the WGV 17 is intrinsically driven to the fully-closed position. In such a case, the process for forcibly driving the WGV 17 to the fully-closed position for the second learning (step 15 in FIG. 3) can be eliminated.

Further, although the embodiment describes a case where the valve is the wastegate valve 17 by way of example, the present invention can be broadly applied insofar as the valve is a valve for regulating the flow of exhaust gases or intake air of the engine. For example, the present invention can be applied to the EGR control valve 22 shown in the embodiment, an air bypass valve for controlling the amount of intake air flowing through a passage bypassing the compressor of the supercharger, and so forth. Further, although in the embodiment, the WGV actuator 18 for driving the WGV 17 is comprised of an electric motor, instead of this, another type of actuator, e.g. an electromagnetic actuator may be employed.

Further, although in the above-described embodiment, the present invention is applied to the automotive gasoline engine by way of example, this is not limitative, but it can be applied to various engines other than the gasoline engine, such as a diesel engine, and further, it can be applied to engines other than the engines for automotive vehicles, such as engines for ship propulsion machines, e.g. an outboard motor having a vertically-disposed crankshaft.

It is further understood by those skilled in the art that the foregoing are preferred embodiment of the invention, and that various changes and modifications may be made without departing from the spirit and scope thereof.

What is claimed is:

1. A valve reference position-learning device for an internal combustion engine, comprising:
   a valve for regulating flow of exhaust gases or intake air of the engine;
   first reference position-learning means for learning a reference position of said valve at a start of the engine;
   storage means for storing the reference position learned by said first reference position-learning means, as an existing learned value;
   second reference position-learning means for learning the reference position of said valve when predetermined learning conditions are satisfied after the start of the engine;
   reference position update means for updating, every time the reference position is learned by said first or second reference position-learning means, the reference position to the learned reference position, and when learning of the reference position by said first reference position-learning means is not completed at the start of the engine, updating the reference position to the existing learned value stored in said storage means; and
   control means for controlling said valve using the reference position.

2. The valve reference position-learning device according to claim 1, wherein the engine includes a supercharger including a turbine driven by exhaust gases and a compressor driven by the turbine for supercharging intake air, wherein said valve is a wastegate valve provided in a bypass passage bypassing the turbine, for regulating an amount of exhaust gases flowing through the bypass passage, and wherein the wastegate valve is driven by an actuator linked thereto via a linking member, the actuator being mounted on a housing that houses the compressor.

* * * * *